United States Patent [19]

Hock

[11] Patent Number: 5,055,758

[45] Date of Patent: Oct. 8, 1991

[54] SMART FUEL PUMP CONTROLLER

[75] Inventor: Darryl A. Hock, Harper Woods, Mich.

[73] Assignee: Jabil Circuit Company, Madison Heights, Mich.

[21] Appl. No.: 502,235

[22] Filed: Mar. 30, 1990

[51] Int. Cl.⁵ ............................................. G05D 16/00
[52] U.S. Cl. ..................................... 318/645; 123/497
[58] Field of Search ........................ 318/645, 806, 811; 123/497; 417/326, 410, 44

[56] References Cited

U.S. PATENT DOCUMENTS

| | | | |
|---|---|---|---|
| 3,247,717 | 4/1966 | Kemmer et al. | 318/645 |
| 4,259,845 | 4/1981 | Norbeck | 318/806 X |
| 4,596,514 | 6/1986 | Matsumoto et al. | 417/44 |
| 4,756,291 | 7/1988 | Cummins et al. | 123/497 |
| 4,791,905 | 12/1988 | Furuta et al. | 123/497 |
| 4,800,859 | 1/1989 | Sagisaka et al. | 123/497 |
| 4,904,162 | 2/1990 | Suzuki | 417/44 |

Primary Examiner—William M. Shoop, Jr.
Assistant Examiner—Saul M. Bergmann
Attorney, Agent, or Firm—Harness, Dickey & Pierce

[57] ABSTRACT

The motor drive circuit has an instrumentation amplifier with a programmable gain set by selectively blowing fuses during initial circuit calibration. The quasi-sawtooth waveform of a relaxation oscillator is compared with the amplified and conditioned signal produced by a pressure responsive Wheatstone bridge circuit. The result of this comparison is a drive signal which controls the pump motor speed. Radio frequency interference is minimized by storing the motor drive current in a capacitor located near the motor. Further interference is minimized by a reactive matching circuit which combines with the motor impedance to result in a purely resistive load.

21 Claims, 5 Drawing Sheets

FIG. 1.

Prior Art

SMART FUEL PUMP CONTROLLER

BACKGROUND AND SUMMARY OF THE INVENTION

The present invention relates generally to fuel delivery systems. More particularly, the invention relates to an electronic circuit for controlling the pump in a fuel injection system.

In a conventional fuel injection delivery system fuel is pumped continuously in a closed fluid circuit from the gas tank, to the fuel rail, back to the gas tank. When the engine is running, the fuel pump operates at full speed, with all unused fuel being recirculated to the tank.

Some automotive engineers believe that it would be desirable to eliminate the continuous recirculation of fuel and hence eliminate the fuel return to tank. This poses the problem of how to control the flow rate of fuel pumped from the tank to the fuel rail if no return to tank is provided. The flow rate is a function of engine RPM and load and thus cannot be considered constant. What is needed, but not available today, is a practical, mass-producible means for controlling the flow rate produced by the fuel pump. Conventional pump control techniques do not meet these requirements and tend to produce severe radio frequency interference (RFI), making them unsuitable for vehicular use.

The present invention overcomes prior deficiencies in fuel delivery systems by providing a pressure responsive motor drive circuit for operating a fluid delivery pump. The invention is well suited to vehicular mass production and overcomes many of the previous problems with radio frequency interference.

According to the invention, a pressure transducer provides an electrical signal in response to a sensed pressure condition within the fuel delivery system. An amplifier circuit, coupled to the pressure transducer, amplifies the electrical signal to produce an amplified signal which is summed with a predetermined DC offset to produce an offset signal. An oscillator circuit, preferably relaxation oscillator, produces an alternating signal of a predetermined frequency, preferably a sawtooth waveform having an exponentially curved rising edge. A comparator circuit is coupled to the oscillator circuit and to the amplifier circuit for producing a pulse train which changes state each time the alternating signal rises above and falls below the level of the offset signal. The comparator thereby produces a pulse signal. A power transistor circuit is coupled to the comparator circuit and provides a current to drive the pump motor. In this fashion the pump motor speed is controlled by the sensed pressure condition in the fluid delivery system and the need for a return to tank is eliminated.

Radio frequency interference is minimized by a power conditioning circuit having an energy storing means such as a capacitor for receiving electrical energy through a power supply transmission line from the vehicular power source. Typically this transmission line spans the length of the vehicle, from vehicle alternator/battery to fuel tank-mounted fuel pump. The energy storage means is coupled to the power transistor circuit to supply energy from which the pulse width modulated current is produced. The energy storage means is of a capacity sufficient to minimize rapid voltage changes over the transmission line and thereby reduce radio frequency radiation by the transmission line. The energy storage means provides sufficient dampening so that the energy being conveyed over the transmission line has a comparatively rounded or slowly fluctuating waveform with few high frequency harmonics. By minimizing high frequency harmonics, radio frequency radiation by the transmission line is minimized.

To further reduce radio frequency interference, the power transistor circuit includes a complementary reactance coupled across the motor terminals to substantially null the inductance of the motor. The combined impedance of the motor and complementary reactance is substantially resistive. This reduces ringing overshoot of the motor drive current which would otherwise potentially cause radio interference in the AM broadcast band.

For a more complete understanding of the invention, its objects and advantages, reference may be had to the following specification and to the accompanying drawings.

BRIEF DESCRIPTION OF THE DRAWINGS

FIG. 3 is a schematic diagram of the control circuit of the invention;

FIG. 6 illustrates another embodiment of the control circuit of the invention.

DESCRIPTION OF THE PREFERRED EMBODIMENT

Figure 1:
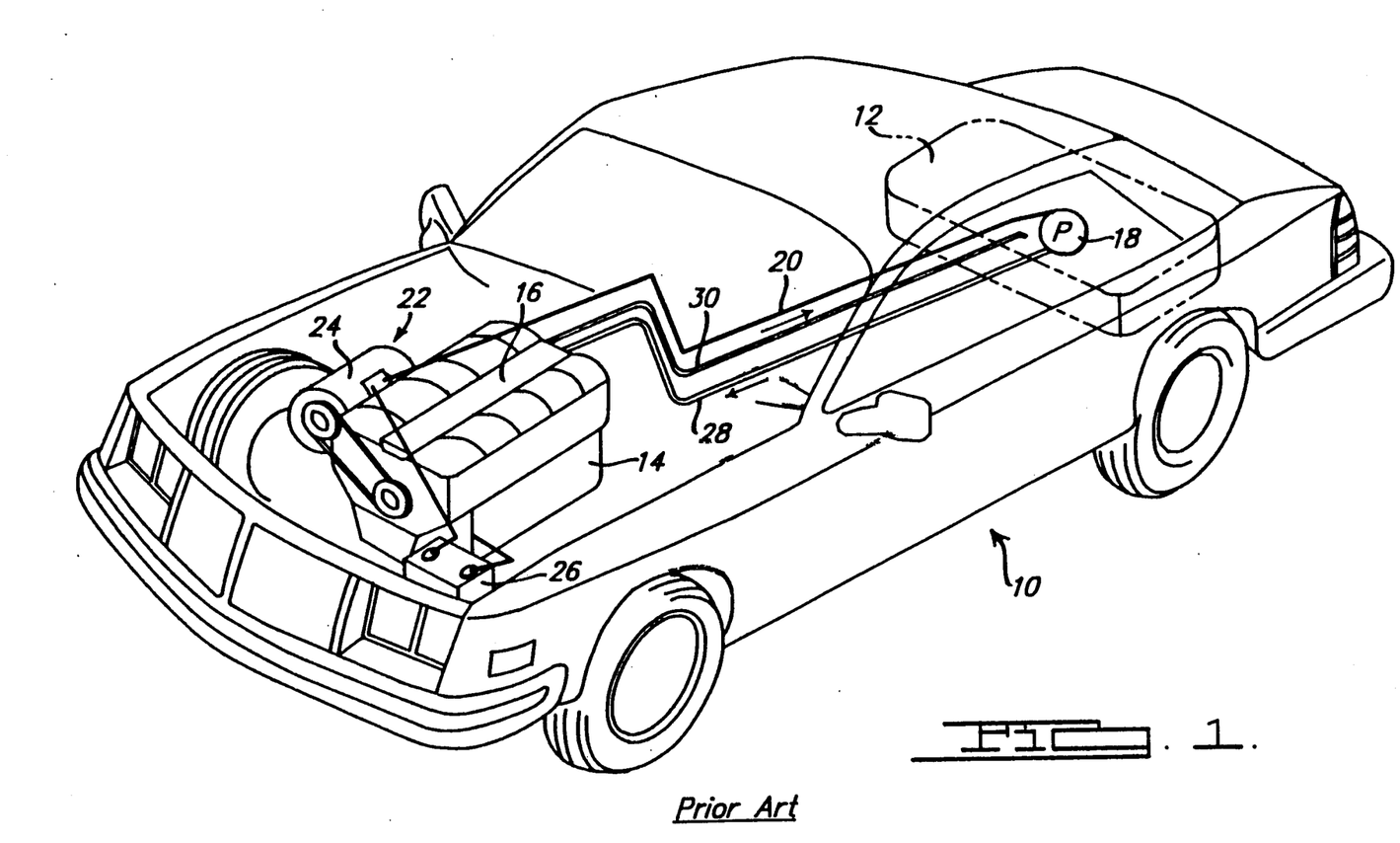
FIG. 1 illustrates the prior art closed-loop fuel delivery system in which the pump circulates fuel continuously with pump operating at a constant speed.
Figure 2:
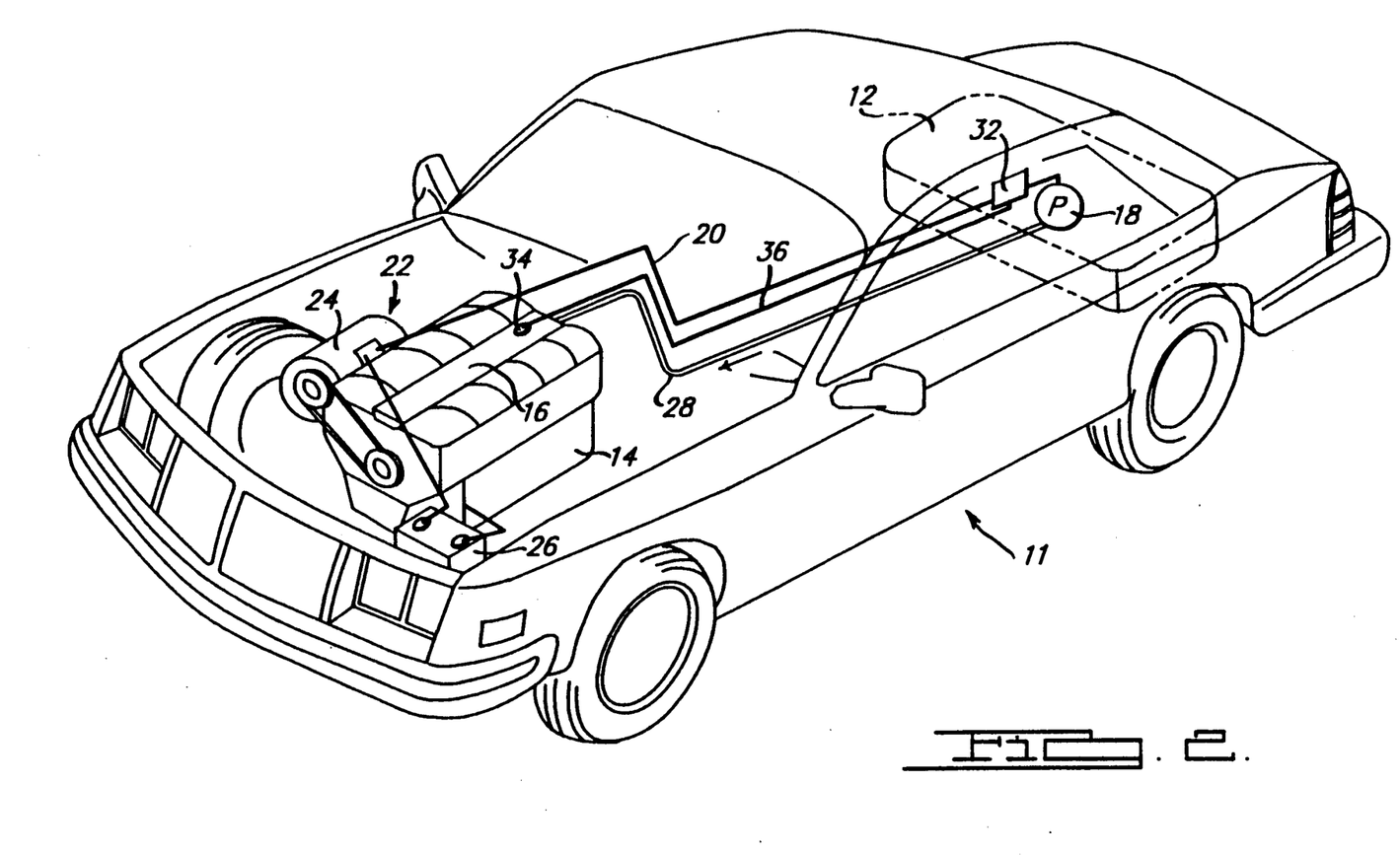
FIG. 2 illustrates the fuel delivery system of the invention in which the pump speed is controlled by sensed pressure.

FIG. 1 illustrates the prior art, closed fluid circuit fuel delivery system in a motor vehicle designated generally at 10. FIG. 2 illustrates a fuel delivery system 11 made possible using the invention. In FIGS. 1 and 2, like elements have been given like reference numerals. Fuel tank 12 is shown in the rear of the vehicle and engine 14 is shown in the forward compartment. The engine includes a fuel rail 16 which supplies fuel to the fuel injectors. In this regard, the illustration is somewhat diagrammatic. The invention is applicable to a wide variety of different fuel injection systems, including throttle body injection systems and multiport injection systems. A fuel pump 18 is illustrated mounted in the vehicle rear adjacent or inside fuel tank 12. Electrical power to operate pump 18 is supplied over the power supply transmission line 20. This transmission line is electrically connected to the vehicular electrical energy source 22, conventionally comprising an alternator 24 and a battery 26. Although the pump has been illustrated in a fuel tank-mounted configuration, the invention may also be implemented in systems with the fuel pump at other locations.

In both FIGS. 1 and 2, a fuel supply line 28 conveys fuel from fuel tank 12 to fuel rail 16 under pressure supplied by pump 18. In FIG. 1, illustrating the prior art configuration, a fuel return line 30 recirculates unused fuel from the fuel rail 16 back to the fuel tank 12. There is no corresponding return line in the embodiment of FIG. 2 illustrating the invention. The fuel delivery system of FIG. 1 comprises a closed fluid circuit. In operation, the pump in this closed fluid circuit operates continuously and at full speed. In contrast, the embodiment of FIG. 2 comprises a unidirectional fuel path with no return circuit.

With continued reference to FIG. 2, pump 18 is supplied with operating current by a controller circuit 32 coupled to the power supply transmission line 20. A pressure transducer 34 is connected via the sensor transmission line 36 to controller circuit 32. The pressure transducer provides an electrical signal in response to a sensed pressure condition within the fuel delivery system. In the illustrated embodiment of FIG. 2, pressure transducer 34 is attached on the fuel rail 16. Other transducer placements are possible, and in general, the transducer may be placed at any suitable location along the fuel supply line to allow the fuel system pressure to be measured. The electrical signal from this pressure transducer provides an electronic feedback signal which is used by the controller circuit to regulate the operating speed of pump 18. In response to feedback, the pump speeds up when fuel consumption is high and slows down when fuel consumption is low. The presently preferred embodiment maintains fuel delivery system pressure at 39 psi.

Referring to FIG. 3, the control circuit 32 is illustrated schematically. Pressure transducer 34 comprises a Wheatstone bridge transducer 38 with a compensation resistor 40. Bridge transducer 38 is available from Nova, Freemont, Calif. The transducer employs a silicon diaphragm which changes resistance when flexed under pressure. The resistance of the diaphragm is measured by a resistive Wheatstone bridge circuit comprising part of the transducer. The transducer is temperature sensitive, and this is compensated for by compensation resistor 40.

An alternate bridge transducer is available from IC Sensors, Milpitas, Calif. Although similar in operation, the bridge transducer manufactured by IC Sensors is driven by a constant current source. The embodiment of FIG. 6 is adapted for use with the IC Sensor's bridge transducer. The circuit topology is essentially the same as that of FIG. 3, with the inclusion of a constant current source 110. Other differences between the embodiments of FIGS. 3 and 6 will be discussed below.

Figure 4:
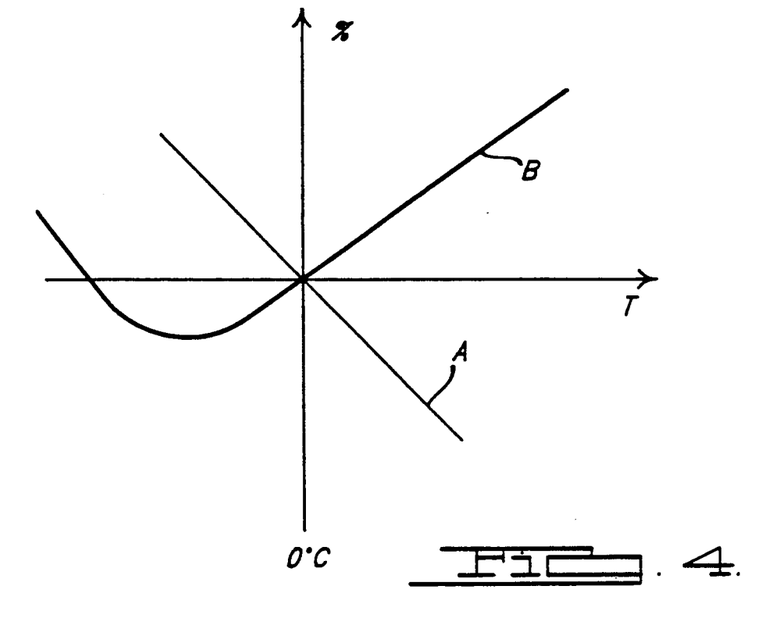
FIG. 4 is a graph illustrating the temperature characteristics of the presently preferred pressure transducer, useful in understanding the invention.

Referring to FIG. 4, the percent change in resistance is plotted as a function of temperature for both the silicon diaphragm (curve A) and compensation resistor 40 (curve B). The compensation resistor is selected so that in the first and fourth quadrants (greater than 0° Centigrade) the slopes of curves A and B are approximately equal in magnitude and opposite in sign. When curves A and B are summed the result yields a 0% change in the first and fourth quadrants (above 0° Centigrade). As seen in FIG. 4, curves A and B also cancel out to yield a 0% change for a portion of the curves in the second and third quadrants (below 0° Centrigrade) Thus compensation resistor 40 is selected whereby the change in resistance as a function of temperature is equal and opposite to that of the silicon diaphragm, thereby negating unwanted temperature effects.

The presently preferred transducer also requires pressure calibration. This is normally done using external compensation resistors, however, the invention eliminates the need for additional compensation resistors by use of the amplification stages yet to be discussed.

The controller circuit further comprises an instrumentation amplifier stage 42 which includes a first operational amplifier 44 and a second operational amplifier 46 connected as shown. Resistors 48, 50, 52 and 54, together with programmable impedance 49 make up the bias and feedback network supporting first operational amplifier 44. Resistors 48, 50 and 52 may be on the order of 10K ohms, with resistor 54 on the order of about 1K ohms. Programmable impedance 49 comprises a parallel network of individually fused resistors 51. Each individual resistor has a fusable link 53 which may be selectively blown by an automated testing apparatus during initial calibration. The parallel combination of all resistors 51, for which the fusable link has not been blown, combine in parallel with resistor 54. The feedback around operational amplifier 44 is thus programmably controlled. The equations below describe how to compute the instrumentation amplifier gain based on the bias resistor values.

As illustrated, the noninverting inputs (designated + in FIG. 3) are respectively coupled to the first and second outputs 55 and 56 of pressure transducer 34. The output of operational amplifier 44 is coupled to the inverting input, designated with a minus sign (−) in FIG. 3, of operational amplifier 46. Feedback resistor 58 provides a feedback path around operational amplifier 46.

The instrumentation amplifier has a high input impedance and uses a combination of inversion and summation to cancel the common-mode component at the two noninverting inputs. The overall gain A of the instrumentation amplifier is given by equation 1 below.

$$\text{LET } \begin{matrix} R_{50} = R_{52} \\ R_{48} = R_{58} \end{matrix}$$

$$\text{THEN } A = \frac{R_{58}}{R_{52}} \left( 1 + \frac{R_{52}}{R_{58}} + \frac{2R_{52}}{R_{54} \parallel R_{51}} \right)$$

The feedback loop comprising the parallel combination of resistor 54 and programmable impedance 49 may be adjusted to adjust the overall instrumentation amplifier gain without altering the common-mode rejection ratio.

The output of instrumentation amplifier 42 is connected through coupling resistor 60 to the amplifier circuit 62. The amplifier circuit establishes a set point which plays a role in controlling pump speed. The amplifier comprises third operational amplifier 64 in a noninverting configuration. Feedback network 66 includes a capacitor 68 which places operational amplifier 64 is essentially an open-loop configuration at low frequencies but in a closed-loop configuration at higher frequencies. The amplifier stage is thus able to respond to instantaneous step changes while subduing the tendency for the pump motor to jitter or hunt about the set point speed. The amplifier thus acts as a signal integrator.

A resistive divider network 70 applies a predetermined set point offset voltage to the inverting input of operational amplifier 64. This offset voltage is impressed onto the signal applied to the noninverting input via coupling resistor 60. The output of operational amplifier 64 is a signal with offset, the output level being a function of the set point established by divider network 70 and by the gain of instrumentation amplifier 42.

This offset signal is applied to one input of comparator 72. The other input of comparator 72 receives an alternating signal from relaxation oscillator circuit 74.

The comparator 72 changes state at its output each time the alternating signal rises above or falls below the level of the offset signal from operational amplifier 64. This will be further explained in connection with FIG. 5 below.

Relaxation oscillator 74 preferably comprises a negative resistance device such as programmable unijunction transistor 76. The unijunction transistor is biased as illustrated and provides a nominally 4 kilohertz quasi-sawtooth waveform characterized by an exponentially rising leading edge and a substantially instantaneous falling edge. The presently preferred waveform is illustrated adjacent relaxation oscillator in FIG. 3 and is also illustrated in FIG. 5.

As previously described, the embodiment of FIG. 6 employs an operational amplifier in a constant current source configuration 110. Operational amplifiers are frequently packaged in multiples. The embodiment of FIG. 6 uses an additional operational amplifier 112, configured as an oscillator. The operational amplifier 112 thus serves as a substitute for the unijunction transistor oscillator of FIG. 3.

Figure 5:
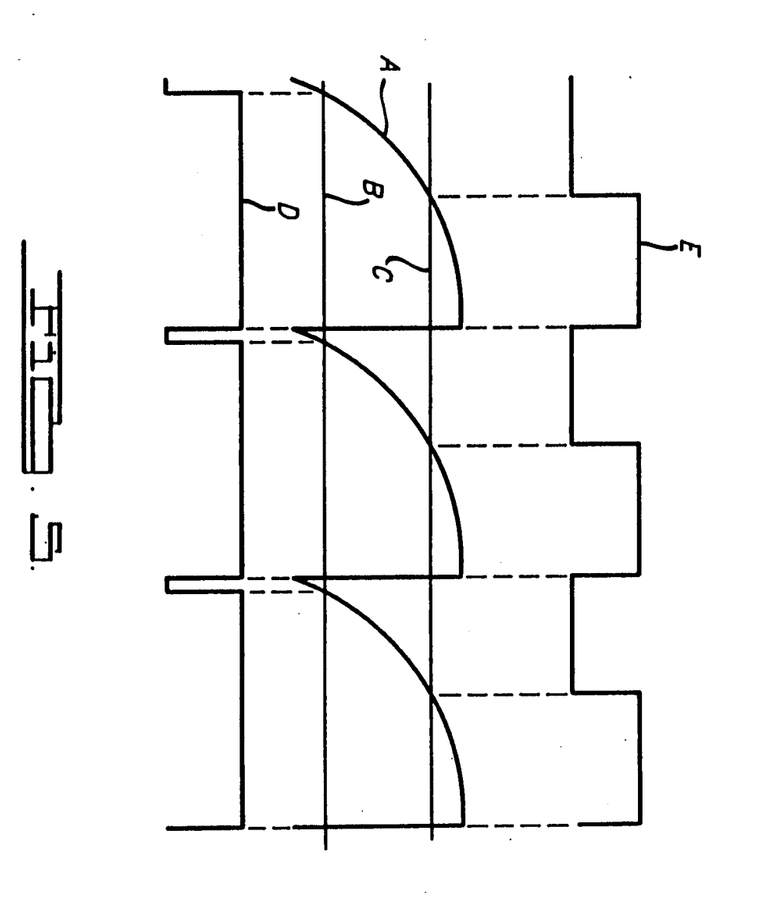
FIG. 5 illustrates exemplary waveforms useful in understanding the operation of the invention.
Figure 7:
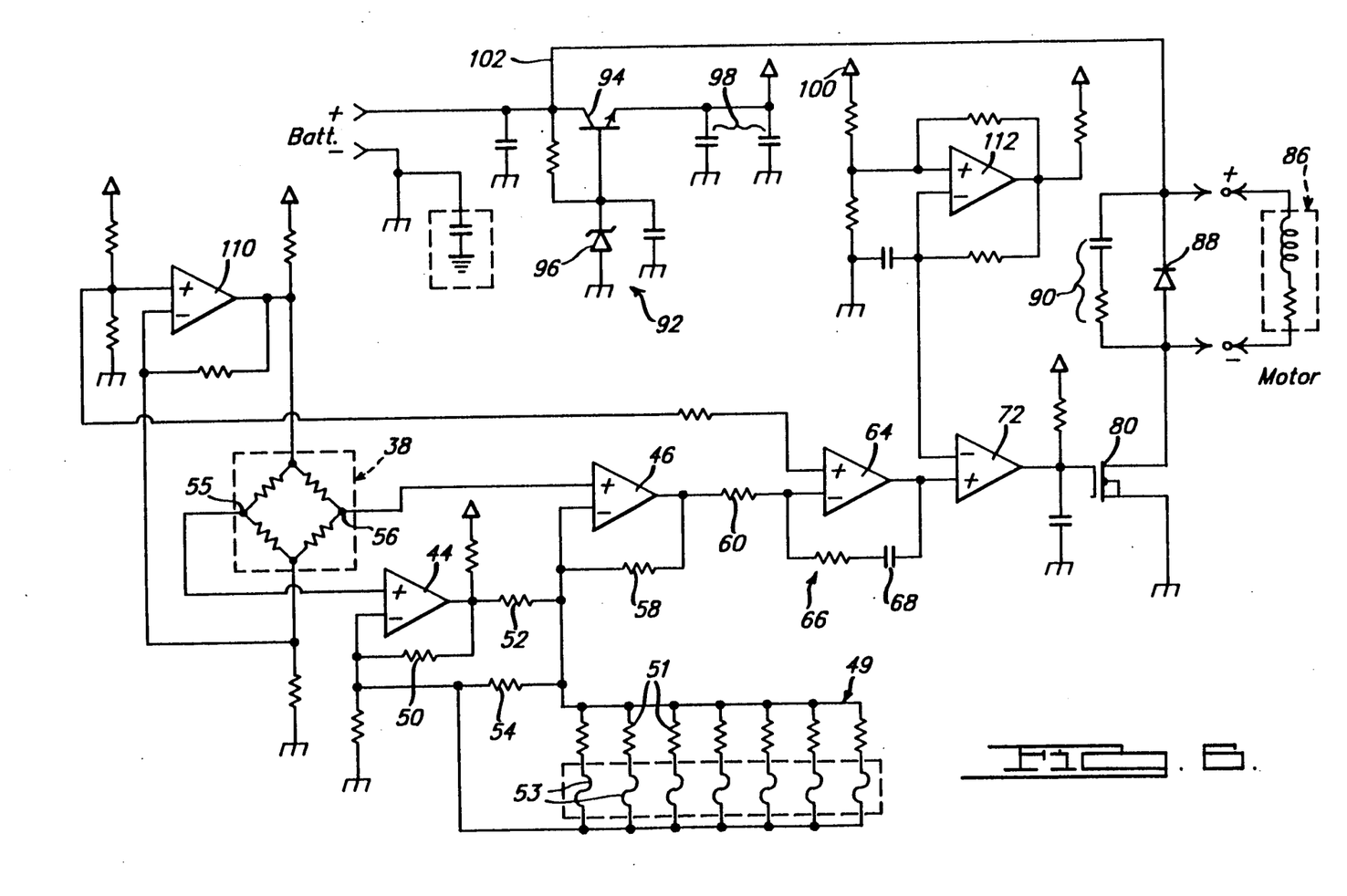

Referring to FIG. 5, the quasi-sawtooth waveform of relaxation oscillator 74 is depicted at A. For comparison purposes, a low threshold level depicted by horizontal line B and a high threshold level depicted by horizontal line C are illustrated intersecting curve A. These levels may correspond to typical output levels from the amplifier circuit 62. As illustrated by pulse waveforms D and E, when the quasi-sawtooth waveform A rises above the threshold level, the pulse waveform changes state from low to high. When the quasi-sawtooth waveform A falls below the reference level, the pulse signal falls from high to low. By comparing pulse waveform D (corresponding to reference level B) and pulse waveform E (corresponding to reference level C), it is seen that the lower reference level B provides the pulse signal of longer duty cycle. These pulse signals are the output of comparator 72, which are used to drive the motor by controlling the power transistor motor driver stage 78. The waveform D represents a nearly fully on condition, while the waveform E represents an approximately 50% duty cycle. By virtue of the shape of quasi-sawtooth waveform A, most of the range of motor speed control is skewed to the fully on, or nearly fully on condition. In other words, the circuit of the invention provides a nonlinear response characteristic, tending to give greater resolution and greater control over speeds near the fully on condition (as opposed to near the fully off condition). This is advantageous, since in practice the fuel pump is normally operated near the fully on regime. The motor driver stage 78 includes a field effect power transistor 80 which is capacitively coupled to chassis ground as at 82. The gate of transistor 80 is capacitively coupled by capacitor 84 to circuit ground to minimize EMI. Capacitor 84 slows FET transistor 80 down to achieve a somewhat slower rise time. Although this makes the FET so somewhat less efficient and tends to cause it to operate at a slightly higher temperature, the switching waveform is more rounded and less rich in high frequency harmonics. In FIG. 3 the pump motor 86 is designated by its equivalent circuit model. Schottky diode 88 is connected across the motor terminals to capture back EMF of the motor. A reactance circuit 90 is also coupled across the motor terminals. The reactance is selected so that the imaginary or reactive portion of the motor impedance is cancelled by the reactance 90, resulting in a purely resistive load. Reactance 90 thus cancels out the imaginary or inductive portion of the motor impedance, thereby eliminating ringing overshoot through the Schottky diode. Without reactance 90, step changes in motor current tend to cause ringing overshoot through the Schottky diode at frequencies which can interfere in the AM broadcast band.

To be useful in a vehicular system, the invention must be capable of operating over a wide range of operating voltages. To allow for this a power conditioning circuit 92 is included. The power conditioning circuit employs an emitter follower amplifier 94 with a 8.2 volt Zener diode 96, which has been found suitable for providing good regulation over a 9 to 16 volt range. The output of emitter follower amplifier is 7.5 volts. The 7.5 volt reference signal is filtered by capacitors 98 and is available as a reference voltage designated by the triangular symbol and reference numeral 100. Several points within the circuit of FIG. 3 are connected to this reference voltage and are also designated by reference numeral 100.

The power conditioning circuit also includes a takeoff point at which B+ voltage is available for supplying the motor driving energy. This B+ takeoff point is depicted by a circle with reference numeral 102. It is seen that the emitter follower and Zener diode voltage regulator circuit isolates the B+ at 102 from the reference voltage at 100. A fuel pump motor may draw on the order of 15 amperes, or approximately 60 watts at full output. Even with the heavy current drain, the voltage reference source at 100 is quite stable.

The controller circuit illustrated in FIG. 3 is quite accurate over a range of supply voltages, in part, because the circuit is ratiometric. The reference voltage 100 is applied to both the pressure transducer 34 and also to the relaxation oscillator 74 and divider network 70. Any changes in supply voltage will be experienced at all three of these reference points, with the ratio of the signals applied to comparator 72 remaining constant. This results in a stable circuit which will work over a wide voltage range.

As previously discussed, the fuel pump 18 is often located a long distance from the vehicular energy source, necessitating a long transmission line, such as transmission line 20 of FIGS. 1 and 2. The motor draws high current, and if this current is switched on and off in pulse fashion to effect speed control, high energy voltage spikes and radio frequency interference are produced. To overcome this problem, the power conditioning circuit 92 includes energy storage capacitor 104 which has sufficient capacity to store and supply energy to operate the motor without requiring fast rise time transients. The capacitor 104 is physically located near the motor to keep motor drive current leads short. In the presently preferred embodiment capacitor 104 is on the order of 470 microfarads. Although the pump motor is still driven by a 15 ampere switched signal, the energy used to develop this signal is transported over transmission line 20 and temporarily stored in capacitor 104. The capacitor 104 acts as a buffer so that the current on transmission line 20 fluctuates in a rounded fashion, without sharp transitions or fast rise times. Because sharp transitions and fast rise times are no longer present on the transmission line, there is less tendency for the transmission line to radiate radio frequency interference.

From the foregoing it is seen that the present invention provides a pressure responsive motor drive circuit which is well suited to automotive applications. The circuit may be advantageously used to drive a fuel pump in a configuration which eliminates the return to tank requirement. While the invention has been described in its presently preferred embodiment, certain modifications to the circuit may be made without departing from the spirit of the invention as set forth in the appended claims.

I claim:

1. A pressure responsive motor drive circuit for fluid delivery systems comprising:
   a pressure transducer which provides an electrical signal in response to a sensed pressure condition;
   an amplifier circuit coupled to said pressure transducer for amplifying said electrical signal to produce an amplified signal;
   an oscillator circuit producing an alternating signal of predetermined frequency;
   a comparator circuit coupled to said oscillator circuit and to said amplifier circuit for producing a pulse train which changes state each time said alternating signal rises above and falls below the level of said amplified signal;
   a power transistor circuit coupled to said comparator circuit for providing a pulsed current to drive a motor such that the motion of said motor is controlled by said sensed pressure condition;
   wherein said amplifier circuit includes programmable bias means for the programmable controlling the gain of said amplifier.

2. The circuit of claim 1 wherein said programmable bias means comprises a plurality of individually fused impedance means coupled to said amplifier circuit to establish a feedback path around said amplifier circuit.

3. The circuit of claim 1 wherein said programmable bias means comprises a plurality of individually fused impedance means arranged in parallel and coupled to said amplifier circuit to establish a feedback path around said amplifier circuit.

4. The circuit of claim 3 wherein said programmable impedance means comprises a plurality of parallel impedance means each having a fusible trace capable of being electrically broken to alter the overall impedance of said programmable impedance means.

5. A pressure responsive motor drive circuit for fluid delivery systems comprising:
   a pressure transducer which provides an electrical signal in response to a sensed pressure condition;
   an amplifier circuit coupled to said pressure transducer for amplifying said electrical signal to produce an amplified signal;
   an oscillator circuit producing an alternating signal of predetermined frequency;
   a comparator circuit coupled to said oscillator circuit and to said amplifier circuit for producing a pulse train which changes state each time said alternating signal rises above and falls below the level of said amplified signal;
   a power transistor circuit coupled to said comparator circuit for providing a pulsed current to drive a motor such that the motion of said motor is controlled by said sensed pressure condition;
   wherein said amplifier circuit includes an integrator stage to subdue rapid changes in motion of said motor.

6. A pressure responsive motor drive circuit for fluid delivery systems comprising:
   a pressure transducer which provides an electrical signal in response to a sensed pressure condition;
   an amplifier circuit coupled to said pressure transducer for amplifying said electrical signal to produce an amplified signal;
   an oscillator circuit producing an alternating signal of predetermined frequency;
   a comparator circuit coupled to said oscillator circuit and to said amplifier circuit for producing a pulse train which changes state each time said alternating signal rises above and falls below the level of said amplified signal;
   a power transistor circuit coupled to said comparator circuit for providing a pulsed current to drive a motor such that the motion of said motor is controlled by said sensed pressure condition;
   further comprising regulated DC voltage reference source coupled to said amplifier circuit for providing said predetermined DC offset.

7. The circuit of claim 6 wherein said pressure transducer comprises a Wheatstone bridge circuit providing first and second outputs;
   wherein said amplifier circuit comprises first, second and third operational amplifiers each having inverting and noninverting inputs and an output;
   wherein said first and second outputs of said bridge circuit are respectively coupled to said noninverting inputs of said first and second operational amplifiers and said output of said first operational amplifier is coupled to said inverting input of said second operational amplifier; and
   wherein said noninverting input of said third operational amplifier is coupled to said output of said second operational amplifier and said inverting input of said third operational amplifier is coupled to said regulated DC voltage reference source.

8. The circuit of claim 7 wherein said predetermined DC offset is established by the gain of said second operational amplifier and by said DC voltage reference source.

9. The circuit of claim 7 wherein said predetermined DC offset is established by the collective gain of said first and second operational amplifiers and by said DC voltage reference source.

10. A pressure responsive motor drive circuit for fluid delivery systems comprising:
    a pressure transducer which provides an electrical signal in response to a sensed pressure condition;
    an amplifier circuit coupled to said pressure transducer for amplifying said electrical signal to produce an amplified signal;
    an oscillator circuit producing an alternating signal of predetermined frequency;
    a comparator circuit coupled to said oscillator circuit and to said amplifier circuit for producing a pulse train which changes state each time said alternating signal rises above and falls below the level of said amplified signal;
    a power transistor circuit coupled to said comparator circuit for providing a pulsed current to drive a motor such that the motion of said motor is controlled by said sensed pressure condition;
    wherein said oscillator circuit employs a negative resistance device.

11. A pressure responsive motor drive circuit for fluid delivery systems comprising:
    a pressure transducer which provides an electrical signal in response to a sensed pressure condition;

an amplifier circuit coupled to said pressure transducer for amplifying said electrical signal to produce an amplified signal;

an oscillator circuit producing an alternating signal of predetermined frequency;

a comparator circuit coupled to said oscillator circuit and to said amplifier circuit for producing a pulse train which changes state each time said alternating signal rises above and falls below the level of said amplified signal;

a power transistor circuit coupled to said comparator circuit for providing a pulsed current to drive a motor such that the motion of said motor is controlled by said sensed pressure condition;

wherein said oscillator circuit comprises a relaxation oscillator.

12. The circuit of claim 11 wherein said oscillator circuit comprises a unijunction transistor device configured as a relaxation oscillator.

13. The circuit of claim 10 wherein said oscillator circuit produces an alternating signal of about 4 kHz.

14. The circuit of claim 10 wherein said oscillator circuit produces a generally sawtooth waveform.

15. The circuit of claim 10 wherein said oscillator circuit produces a generally sawtooth waveform having an exponentially curved rising edge and a substantially instantaneous falling edge.

16. A pressure responsive motor drive circuit for fluid delivery systems comprising:

a pressure transducer which provides an electrical signal in response to a sensed pressure condition;

an amplifier circuit coupled to said pressure transducer for amplifying said electrical signal to produce an amplified signal;

an oscillator circuit producing an alternating signal of predetermined frequency;

a comparator circuit coupled to said oscillator circuit and to said amplifier circuit for producing a pulse train which changes state each time said alternating signal rises above and falls below the level of said amplified signal;

a power transistor circuit coupled to said comparator circuit for providing a pulsed current to drive a motor such that the motion of said motor is controlled by said sensed pressure condition;

wherein said power transistor circuit includes a field effect transistor device.

17. The circuit of claim 11 wherein said power transistor circuit includes a diode coupled across said motor for dissipating back EMF generated by said motor.

18. The circuit of claim 17 wherein said diode comprises a Schottky diode device.

19. A pressure responsive motor drive circuit for fluid delivery systems comprising:

a pressure transducer which provides an electrical signal in response to a sensed pressure condition;

an amplifier circuit coupled to said pressure transducer for amplifying said electrical signal to produce an amplified signal;

an oscillator circuit producing an alternating signal of predetermined frequency;

a comparator circuit coupled to said oscillator circuit and to said amplifier circuit for producing a pulse train which changes state each time said alternating signal rises above and falls below the level of said amplified signal;

a power transistor circuit coupled to said comparator circuit for providing a pulsed current to drive a motor such that the motion of said motor is controlled by said sensed pressure condition;

wherein said power transistor circuit includes reactance means coupled across said motor substantially null the inductance of said motor and thereby reduce ringing overshoot of the motor drive current.

20. A pressure responsive motor drive circuit for fluid delivery systems comprising:

a pressure transducer which provides an electrical signal in response to a sensed pressure condition;

an amplifier circuit coupled to said pressure transducer for amplifying said electrical signal to produce an amplified signal;

an oscillator circuit producing an alternating signal of predetermined frequency;

a comparator circuit coupled to said oscillator circuit and to said amplifier circuit for producing a pulse train which changes state each time said alternating signal rises above and falls below the level of said amplified signal;

a power transistor circuit coupled to said comparator circuit for providing a pulsed current to drive a motor such that the motion of said motor is controlled by said sensed pressure condition;

further comprising energy storage means for receiving electrical energy through a transmission line from a remote power source;

said energy storage means being coupled to said power transistor circuit to supply energy from which said pulse width modulated current is produced;

said energy storage means being of sufficient capacity to minimize rapid voltage changes over said transmission line and thereby reduce radio frequency radiation by said transmission line.

21. A pressure responsive motor drive circuit for fluid delivery systems comprising:

a pressure transducer which provides an electrical signal in response to a sensed pressure condition;

an amplifier circuit coupled to said pressure transducer for amplifying said electrical signal to produce an amplified signal;

an oscillator circuit producing an alternating signal of predetermined frequency;

a comparator circuit coupled to said oscillator circuit and to said amplifier circuit for producing a pulse train which changes state each tim said alternating signal rises above and falls below the level of said amplified signal, a power transistor circuit coupled to said comparator circuit for providing a pulsed current to drive a motor such that the motion of said motor is controlled by said sensed pressure condition; and further comprising regulated DC voltage reference source for receiving electrical energy from a vehicular electrical energy source, said reference source being coupled to said amplifier circuit for providing said predetermined DC offset and also being coupled to said pressure transducer to supply electrical energy from which said electrical signal is developed, said motor drive circuit thereby being ratiometric and accurate over a range of supply voltages of said vehicular electrical energy source.

* * * * *